United States Patent
Mubaslat et al.

(10) Patent No.: US 12,473,077 B2
(45) Date of Patent: Nov. 18, 2025

(54) REMOTE ACTUATION SYSTEMS AND RELATED SIX-PHASE MOTOR CONTROL METHODS

(71) Applicant: HONEYWELL INTERNATIONAL INC., Charlotte, NC (US)

(72) Inventors: Saed Mubaslat, Urbana, OH (US); Saeideh Khadem Haghighian, Torrance, CA (US); Paul Schwerman, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/642,497

(22) Filed: Apr. 22, 2024

(65) Prior Publication Data
US 2025/0326486 A1     Oct. 23, 2025

(51) Int. Cl.
*B64C 13/50* (2006.01)
*H02P 6/17* (2016.01)
(Continued)

(52) U.S. Cl.
CPC ........... *B64C 13/503* (2013.01); *H02P 6/17* (2016.02); *H02P 25/22* (2013.01); *H02P 27/06* (2013.01)

(58) Field of Classification Search
CPC .......... B64C 13/503; H02P 6/17; H02P 25/22; H02P 27/06
See application file for complete search history.

(56) References Cited

U.S. PATENT DOCUMENTS

| 4,030,015 A | 6/1977 | Herko et al. |
| 5,471,353 A | 11/1995 | Codilian et al. |

(Continued)

FOREIGN PATENT DOCUMENTS

| CN | 204761343 U | 11/2015 |
| CN | 106301148 A | 1/2017 |

(Continued)

OTHER PUBLICATIONS

A. Mohammad, M. A. Abedin and M. Z. R. Khan, "Implementation of a three phase inverter for BLDC motor drive" 2016 9th International Conference on Electrical and Computer Engineering (ICECE), Dhaka, Bangladesh, 2016, pp. 337-340, doi: 10.1109/ICECE.2016.7853925.

(Continued)

Primary Examiner — Rodney A Bonnette
(74) Attorney, Agent, or Firm — Ingrassia, Fisher & Lorenz LLP

(57) ABSTRACT

Fly-by-wire vehicle systems and related actuation systems and operating methods are provided for actuating a flight control component. An exemplary system includes a power conversion arrangement including phase legs between a supply reference voltage node and a second reference voltage node, a six-phase motor coupled to the flight control component, where each winding of the six-phase motor is coupled between a respective output node of a respective phase leg of the power conversion arrangement and a common neutral node, a topology configuration switching element coupled between the common neutral node and the second reference voltage node, and a control module to operate the topology configuration switching element based on measurement data indicative of a current state of the six-phase motor and operate a respective subset of the (Continued)

plurality of phase legs based at least in part on a state of the topology configuration switching element.

20 Claims, 7 Drawing Sheets

(51) Int. Cl.
  *H02P 25/22* (2006.01)
  *H02P 27/06* (2006.01)

(56) References Cited

U.S. PATENT DOCUMENTS

| | | | |
|---|---|---|---|
| 8,536,811 B2 | 9/2013 | Wrobel et al. | |
| 8,558,501 B2 | 10/2013 | Tsunematsu et al. | |
| 9,503,001 B2 | 11/2016 | Wasson et al. | |
| 11,267,574 B2 | 3/2022 | Benson et al. | |
| 2005/0017672 A1* | 1/2005 | Suzuki | F02B 39/10 318/802 |
| 2018/0022576 A1* | 1/2018 | Jiang | H02P 27/08 187/297 |
| 2020/0127591 A1* | 4/2020 | Ishida | H02P 25/22 |
| 2020/0215922 A1 | 7/2020 | Sawata et al. | |
| 2021/0006188 A1* | 1/2021 | Endo | H02P 21/08 |
| 2023/0057522 A1 | 2/2023 | Fujiwara et al. | |
| 2023/0412097 A1* | 12/2023 | Arafat | H02P 23/009 |

FOREIGN PATENT DOCUMENTS

| | | |
|---|---|---|
| CN | 207835370 U | 9/2018 |
| CN | 210011900 U | 2/2020 |
| CN | 108574442 B | 3/2021 |
| CN | 113904595 A | 1/2022 |
| CN | 115913001 A | 4/2023 |
| EP | 1187306 B1 | 11/2005 |
| EP | 2611025 A1 | 7/2013 |
| IT | 201900015860 A1 | 3/2021 |
| JP | 6379817 B2 | 8/2018 |
| KR | 20000049658 A | 8/2000 |
| KR | 100626220 B1 | 9/2006 |
| WO | 2024077213 A1 | 4/2024 |

OTHER PUBLICATIONS

Gunhee Jang and M.G. Kim, "A Bipolar-Statring and Unipolar-Running Method to Drive a Hard Disk Drive Spindle Motor at high Speed with Large Starting Torque," IEEE Transaction on Magnets, vol. 41, No. 2, Feb. 2005.

* cited by examiner

REMOTE ACTUATION SYSTEMS AND RELATED SIX-PHASE MOTOR CONTROL METHODS

TECHNICAL FIELD

The subject matter described herein relates generally to vehicle systems, and more particularly, embodiments of the subject matter relate to motor control systems and methods for vertical take-off and landing (VTOL) aircraft and other aircraft systems.

BACKGROUND

In some modern aircraft, traditional mechanical flight control systems have been replaced with electrically controlled actuators, often referred to as fly-by-wire. Instead of mechanical linkages between cockpit controls and flight control surfaces, propulsion systems and/or lift systems, electrical signals are utilized to communicate movements of cockpit controls to the controllers associated with the appropriate flight control components or systems. Vertical take-off and landing (VTOL) aircraft or other aircraft non-conventional aircraft may include any number of different actuators or effectors arranged or distributed at various locations throughout the body of the aircraft and operated independently of one another to provide lift, propulsion, and/or attitude control for the aircraft (e.g., propellers, lift fans, rotors, flight control surface actuators, and/or the like), which increases the amount of wiring and interfaces required. For smaller aircraft, such as air taxis or other urban air mobility (UAM) vehicles, it is often desirable to minimize the amount of wiring, weight, and associated costs.

In aviation contexts or other safety critical applications, it is desirable to provide redundancy and fail operational systems. However, traditional power converters and motor controllers typically have various inefficiencies, limitations or other disadvantages as applied to aviation applications, such as VTOL aircraft. For example, direct current (DC) to DC converters may be limited to fixed outputs or other fixed parameters that are highly dependent on hardware, while also lacking redundant and efficient control algorithms capable of adaptively adjusting parameters to account for different power demands at different motor torques or motor speeds that may arise in a VTOL application. Accordingly, it is desirable to provide motor control systems and methods that are fail operational and capable of providing or otherwise supporting redundancy to avoid potential single points of failure. Other desirable features and characteristics will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Fly-by-wire vehicle systems and related remote actuation systems and operating methods are provided. An exemplary system includes a power conversion arrangement having a plurality of phase legs, wherein each phase leg of the plurality of phase legs is coupled between a first reference voltage node and a second reference voltage node, a six-phase motor having a plurality of windings, wherein each winding of the plurality of windings is coupled between a respective output node of a respective phase leg of the plurality of phase legs and a third node, a topology configuration switching element coupled between the third node and the second reference voltage node, and a control module coupled to the topology configuration switching element and the power conversion arrangement to operate the topology configuration switching element based on measurement data indicative of a current state of the six-phase motor and operate a respective subset of the plurality of phase legs based at least in part on a state of the topology configuration switching element.

An exemplary method of operating a six-phase motor associated with an actuatable component of a vehicle is also provided. The method involves receiving an actuation command for the actuatable component, obtaining, from one or more systems onboard the vehicle, measurement data indicative of a current operating state associated with the vehicle, identifying a commutation type for the six-phase motor based at least in part on the current operating state associated with the vehicle, operating a topology configuration switching element connected between a common neutral node of the six-phase motor and a reference node to based on the commutation type to vary the commutation type from a prior commutation type, and operating one or more phase legs of a power conversion arrangement to provide input power to the six-phase motor based at least in part on the actuation command in accordance with the commutation type based at least in part on a state of the topology configuration switching element, wherein each phase leg of the one or more phase legs is coupled between a voltage regulation arrangement and the reference node and each winding of a plurality of windings of the six-phase motor is coupled between a respective output node of a respective phase leg of the one or more phase legs and the common neutral node.

An apparatus is also provided for a non-transitory computer-readable medium having computer-executable instructions stored thereon that, when executed by a processing system, cause the processing system to receive an actuation command for an actuatable component of a vehicle, obtain, from one or more systems onboard the vehicle, measurement data indicative of a current operating state associated with the vehicle, identify a commutation type for a six-phase motor coupled to the actuatable component based at least in part on the current operating state associated with the vehicle, operate a topology configuration switching element connected between a common neutral node of the six-phase motor and a reference node to based on the commutation type to vary the commutation type from a prior commutation type, and operate one or more phase legs of a power conversion arrangement to provide input power to the six-phase motor based at least in part on the actuation command in accordance with the commutation type based at least in part on a state of the topology configuration switching element. Each phase leg of the one or more phase legs is coupled between a voltage regulation arrangement and the reference node and each winding of a plurality of windings of the six-phase motor is coupled between a respective output node of a respective phase leg of the one or more phase legs and the common neutral node.

Furthermore, other desirable features and characteristics of the subject matter described herein will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
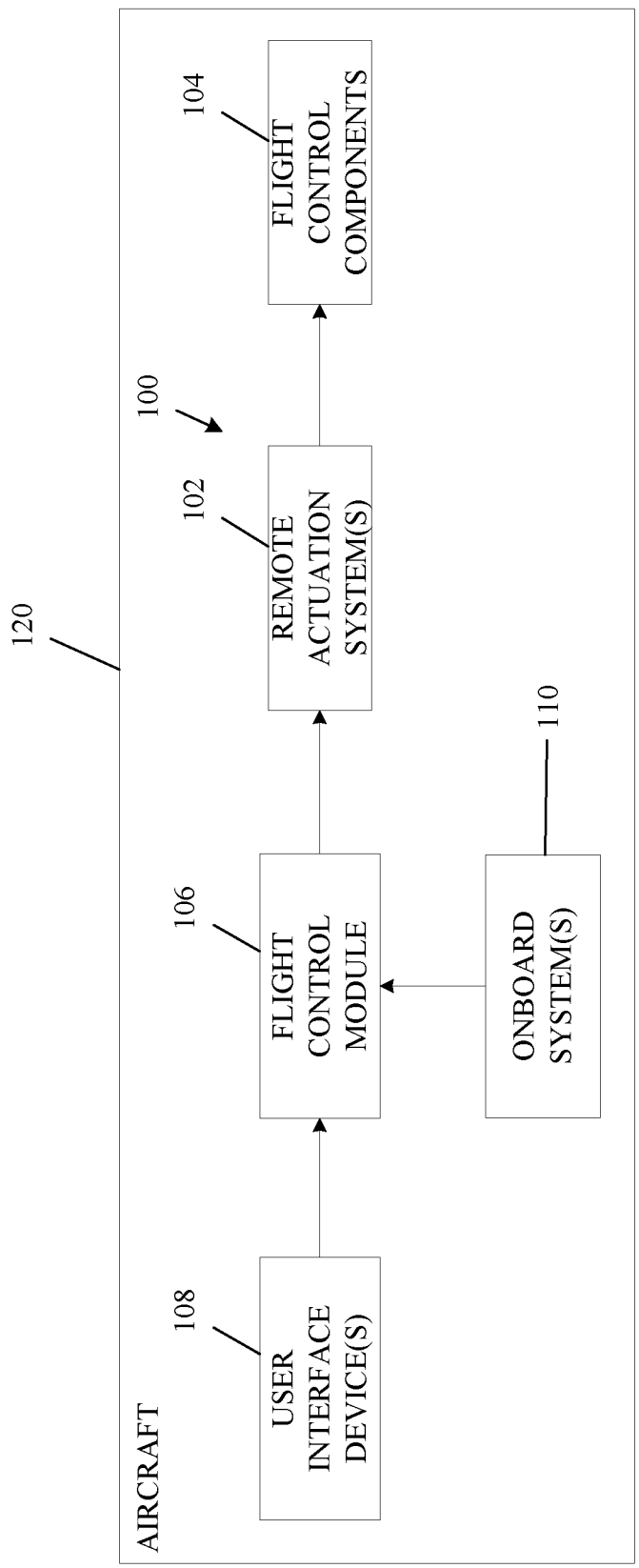
FIG. 1 is a block diagram illustrating a fly-by-wire system suitable for use with a vehicle such as an aircraft in accordance with one or more exemplary embodiments.

The following detailed description is merely exemplary in nature and is not intended to limit the subject matter of the application and uses thereof. Furthermore, there is no intention to be bound by any expressed or implied theory presented in the preceding technical field, background, brief summary, or the following detailed description.

Embodiments of the subject matter described herein relate to electrically controlled vehicle systems. For purposes of explanation, the subject matter is described herein primarily in the context of aircraft where flight control components are controlled using electrical signals, however, the subject matter is not necessarily limited to use with aircraft and may be implemented in an equivalent manner for other types of vehicles (e.g., automotive vehicles, marine vessels, or the like). That said, exemplary embodiments may be described herein in the context of urban air mobility (UAM) vehicles or other vertical takeoff and landing (VTOL) aircraft that includes various remote actuation systems that actuate or otherwise operate flight control components which provide lift, propulsion, and/or attitude control for the aircraft, such as, for example, a flight control surface actuator, lift fan, motor, or similar flight control component capable of adjusting or otherwise influencing a position or orientation of the aircraft.

As described in greater detail below, in exemplary embodiments, an electric motor associated with a flight control component of a UAM vehicle, a VTOL aircraft, or other type of aircraft or rotorcraft is configured as a six-phase motor that includes six sets of stator windings coupled to respective corresponding phases of a power conversion arrangement (e.g., an inverter or other power converter). A motor control system is coupled to the six-phase power conversion arrangement and is configurable to operate the respective phase legs of the power conversion arrangement to commutate the six-phase motor in a variety of different commutation topologies or configurations, including, but not limited to, as a six-phase brushless direct current (BLDC) motor, a six-phase alternating current (AC) asynchronous induction motor, two redundant three-phase BLDC motors, two redundant three-phase AC induction motors, a three-phase BLDC motor, a three-phase AC induction motor, a four-phase motor, a two-phase motor, a single-phase motor, or hybrid combinations thereof. In exemplary implementations, the motor control system is also configurable to operate a topology configuration switching element that is coupled between a node coupled to each of the sets of stator windings and a reference voltage node (e.g., a negative bus voltage node, a ground reference voltage node or the like) that is operable to switch the commutation type between unipolar (or unidirectional) commutation and bipolar (or bidirectional commutation). In this manner, the motor control system is capable of varying both the type of commutation utilized as well as the particular commutation topology for the motor to tailor operation of the motor to the current state of the aircraft and/or the current state of the motor (e.g., the current motor speed, the current motor current and/or the like) to achieve the desired torque, speed, efficiency, and/or other performance characteristics for the motor.

For example, in one or more exemplary embodiments, the motor control system may initially operate the inverter or other power converter to commutate the six-phase motor as a six-phase BLDC motor at relatively lower motor speeds (e.g., motor speeds below a speed threshold) with the topology configuration switching element being open or otherwise deactivated to support a bipolar (or bidirectional) 6-phase BLDC commutation when the actuation commands for the motor and/or flight control component correspond to an increased torque demand. While operated as a six-phase BLDC motor, the inverter phase legs may be activated and deactivated in the appropriate sequence with the appropriate duty cycle and switching frequency to rotate the rotor of the BLDC motor in the commanded direction of rotation with the desired motor speed. In this regard, while operating the motor as a six-phase BLDC motor, the measured motor speed, measured motor position, measured motor current and/or the like may be fed back to a control module or other processing that implements various control algorithms, logic or other software to compare the feedback measurements indicative of the current state of actuation of the motor to the targeted actuation of the motor corresponding to the actuation commands received from a supervisory system.

Thereafter, when the motor speed is greater than or equal to an initial speed threshold, the inverter may be commanded to transition to alternately commutating the six-phase motor in a unipolar (or unidirectional) commutation by alternately closing or otherwise activating the topology configuration switching element to support unipolar (or unidirectional) 6-phase BLDC commutation to reduce switching losses while maintaining increased torque capability and reduced torque ripple relative to other commutation topologies. For example, during an electrical cycle, the motor control system may operate the inverter and topology configuration switching element to commutate the motor as a 6-phase bipolar BLDC motor for an initial percentage of time (e.g., 80% of an electrical cycle) and then operate the inverter and topology configuration switching element to commutate the motor as a 6-phase unipolar BLDC motor for the remaining percentage of the time (e.g., the remaining 20% of the electrical cycle). In some implementations, the motor control system progressively increases the ratio or percentage of time that the motor is commutated as a unipolar motor relative to a bipolar motor in a manner that is substantially proportional to the speed of the motor, such that the percentage of unipolar commutation approaches 100% of the time as the motor speed approaches an upper speed threshold. Thereafter, the motor control system may operate the inverter and topology configuration switching element to provide unipolar commutation while the motor speed is maintained above the upper speed threshold.

In some implementations, after transitioning to unipolar commutation, the motor control system operate the inverter or other power converter to commutate the six-phase motor as a three-phase AC induction motor or some other hybrid of commutation topologies for improved efficiency at higher speeds where less torque is required. For example, in the context of a UAM or other VTOL aircraft, the motor control system may initially deactivate the topology configuration switching element and commutate the 6-phase motor bidirectionally as a 6-phase BLDC motor to achieve greater torque and/or lower torque ripple at takeoff. Thereafter, as the aircraft altitude increases above a threshold altitude and/or a threshold speed and begins transitioning from takeoff (or vertical flight) to cruising (or forward flight), the motor control system may gradually and/or progressively begin commutating the 6-phase motor unidirectionally to reduce switching losses and/or improve motor efficiency as the motor speed increases by toggling or otherwise alternately activating and deactivating the topology configuration switching element. Once the aircraft reaches cruising altitude and/or cruising forward speeds, the motor control system may maintain the topology configuration switching element to commutate the 6-phase motor unidirectionally to reduce switching losses and transition from operating the 6-phase motor as a BLDC motor to a 3-phase AC synchronous induction motor. Conversely, when the aircraft slows down and/or begins descending towards landing, the motor control system may reverse operation of the motor to transition from commutating the motor unidirectionally (e.g., as a 3-phase AC synchronous induction motor) back towards commutating as a bidirectional 6-phase BLDC motor for better torque control to facilitate landing the aircraft.

FIG. 1 depicts an exemplary embodiment of a fly-by-wire system 100 suitable for use with a vehicle such as an aircraft 120. In exemplary implementations, the aircraft 120 is realized as a UAM vehicle, a VTOL aircraft, or another aircraft that includes multiple different remote actuation systems 102 that are operable to control or otherwise manage respective flight control components 104 (e.g., propellers, lift fans, flight control surfaces and/or the like) distributed about the body of the aircraft 120, and thereby, control the position, orientation and/or attitude of the aircraft 120. In exemplary implementations, each remote actuation system 102 manages a unique flight control component 104 (or a set of flight control components) that is different from those flight control components 104 managed by other remote actuation system 102. That said, in practice, some implementations may employ redundancy, where more than one remote actuation system 102 is capable of operating a common flight control component 104.

The remote actuation systems 102 are communicatively coupled to a flight control module 106, which generally represents the processing system, processing device, hardware, circuitry, logic, software, firmware and/or other components of the fly-by-wire system 100 that are configured to receive signals indicative of a sensed or measured position, orientation, or adjustment to user interface devices 108 associated with the aircraft 120 and convert the inputs or adjustments received at the user interface devices 108 into corresponding command signals for one or more flight control components 104 and output or otherwise provide the command signals to the remote actuation systems 102. For purposes of explanation, the flight control module 106 may alternatively be referred to herein as a flight control computer (FCC). The flight control computer 106 may be implemented or realized using any suitable processing system and/or device, such as, for example, one or more processors, central processing units (CPUs), controllers, microprocessors, microcontrollers, processing cores and/or other hardware computing resources configured to support the operation described herein. In this regard, each flight control computer 106 may include or access a data storage element (or memory) capable of storing programming instructions for execution that, when read and executed by the flight control computer 106, cause the flight control computer 106 to support operations of the fly-by-wire system 100. In practice, some implementations may employ redundancy, where multiple different instances of the flight control computer 106 independently determine and provide redundant command signals to a remote actuation system 102 concurrently.

The user interface devices 108 may be realized as one or more cockpit user interface devices onboard the aircraft 120, such as, for example, a joystick, lever, switch, knob, line select key, touch panel (or touchscreen), keypad, touchpad, keyboard, mouse or another suitable device adapted to receive input from a user. For example, the user interface devices 108 may be realized as joysticks including one or more sets of sensors configured to sense the position of a respective joystick in a reference direction (e.g., a horizontal or x-reference direction, a vertical or y-reference direction and/or the like), with each sensor being coupled to the flight control computer 106 to provide indicia of the user input position of the respective joystick. That said, it should be noted that although the subject matter may be described herein primarily in the context of pilot inputs or other input received via user interface devices 108 utilized to operate flight control components 104 in fly-by-wire aircraft 120, the subject matter described herein is not intended to be limited to any particular type of input to the flight control computer 106, and may be utilized in the context of any other type of measurement or command data (e.g., flight plan data) that may be input to a flight control module 106 for purposes of determining commands for operating the flight control components 104. Accordingly, the subject matter may be implemented in an equivalent manner for autonomously or remotely controlled aircraft. One or more exemplary arrangements of cockpit user interface devices, sensors, and flight control computers are described and depicted in U.S. Pat. No. 11,155,341, which is incorporated by reference herein.

In practice, onboard systems 110 are communicatively coupled to the flight control computer 106 to provide real-time data and/or information regarding the operation of the aircraft 120 to the flight control computer 106 for analysis in conjunction with the user input received via the user interface device(s) 108. For example, in the context of an aircraft 120, the onboard systems 110 may include one or more avionics systems that support navigation, flight planning, and other aircraft control functions, and in practice, will likely include one or more of the following avionics systems suitably configured to support operation of the aircraft: a flight management system (FMS), a navigation system, a communications system, an autopilot system, an autothrust system, a weather system, an air traffic management system, a radar system, a traffic avoidance system, hydraulics systems, pneumatics systems, environmental systems, electrical systems, engine systems, trim systems, lighting systems, crew alerting systems, electronic checklist systems, an electronic flight bag and/or another suitable avionics system. Based on the data or information received from the respective onboard systems 110 and the user input to a respective user interface device 108, the flight control computer 106 commands for controlling the position of or otherwise operating one or more of the flight control components 104 to adjust the position and/or attitude of the aircraft 120.

During operation of the aircraft, the flight control computer 106 continually analyzes the outputs of the user interface devices 108 and the onboard avionics systems 110 to determine corresponding commands for how the respective flight control components 104 should be operated in response to adjustments or changes to the user interface devices 108 substantially in real-time. In this regard, in exemplary implementations, the flight control computer 106 calculates or otherwise determines a rate or amount of actuation associated with a particular flight control component 104 to adjust the position and/or attitude of the aircraft 120 in a manner corresponding to the user input received via a user interface device 108 and provides a corresponding command signal to the remote actuation system 102 associated with that flight control component 104 to effectuate the received user input.

In exemplary embodiments, the flight control computer 106 calculates or otherwise determines a desired rate and direction of actuation for a motor or other actuator associated with a remote actuation system 102 to produce the desired actuation of the flight control component(s) 104 associated with that remote actuation system 102 to adjust the position and/or attitude of the aircraft 120 in the desired manner and provides a corresponding command signal to the remote actuation system 102 for implementation. In some exemplary implementations, the command signal has a signal characteristic indicative of a commanded rotation and a commanded rotational direction for a motor associated with the remote actuation system 102.

Figure 2:
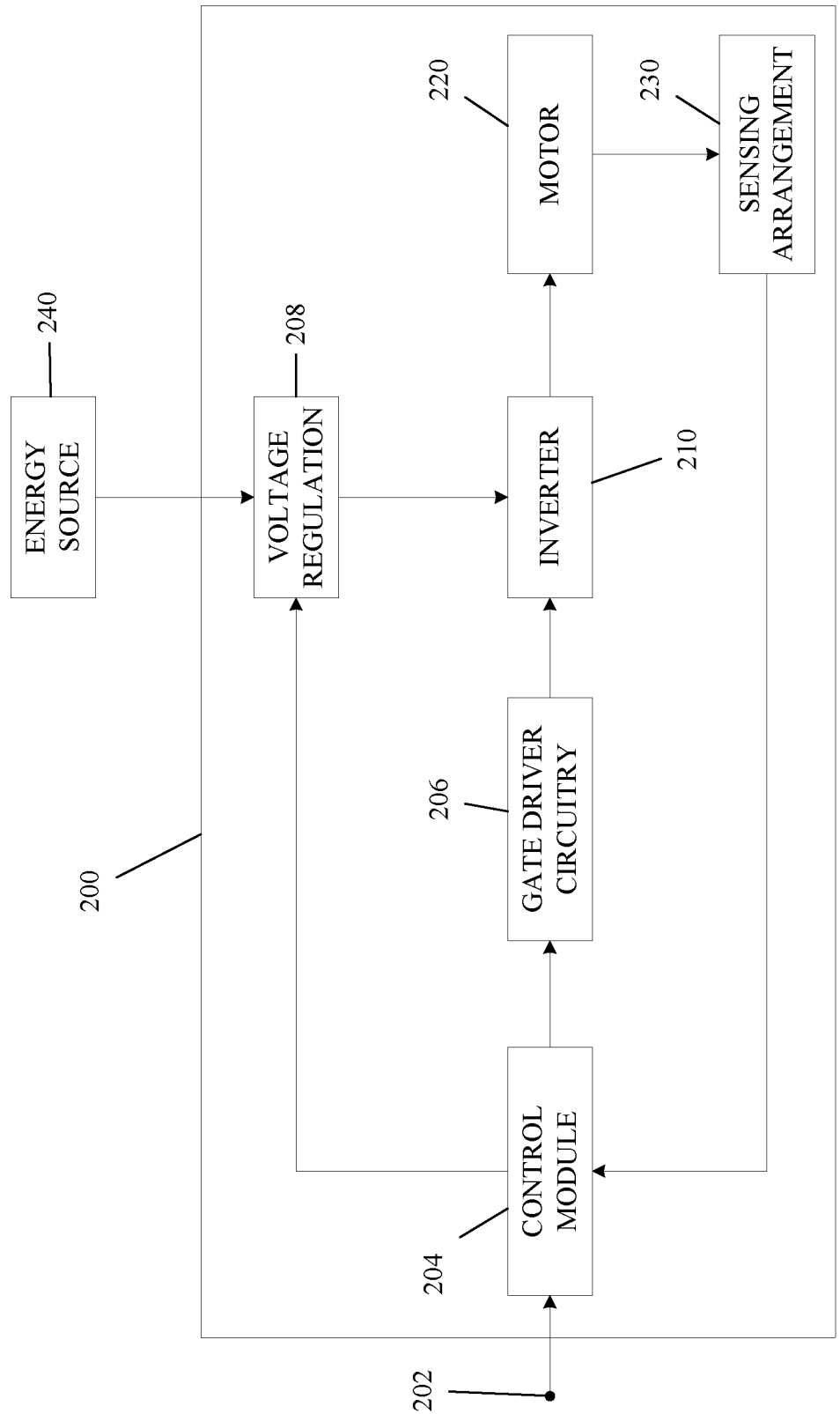
FIG. 2 is a block diagram of an actuation system suitable for use as a remote actuation system to control a flight control component responsive to an input command signal from a flight control module in the fly-by-wire system of FIG. 1 in an exemplary embodiment.

FIG. 2 depicts an exemplary embodiment of an actuation system 200 suitable for use as a remote actuation system 102 in the fly-by-wire system 100 of FIG. 1. In this regard, the actuation system 200 includes an actuator 220 that is capable of being mechanically coupled to or otherwise configured to actuate a flight control component 104 to influence the position and/or attitude of an aircraft 120, as described above. For purposes of explanation, the subject matter is described herein in the context of the actuator 220 being realized as a motor that is operable using a power conversion arrangement such as an inverter 210; however, it should be appreciated that the subject matter described herein is not necessarily limited to any particular type of actuator, power conversion arrangement or combination thereof.

The illustrated actuation system 200 includes an input interface 202, which generally represents the pins, connectors, terminals, ports or other input nodes associated with the actuation system 200 capable of being connected or otherwise coupled to an electrical cable or wiring for receiving an input command signal from a flight control computer or other supervisory control module external to the actuation system 200. The actuation system 200 includes control module 204, which generally represents hardware, software, firmware and/or other components that are coupled to the input interface 202 to receive the input command signal and automatically convert the input command signal into a corresponding rotational speed command and commanded rotational direction for the motor 220 to produce the desired actuation of a flight control component. In this regard, the control module 204 may include or otherwise be implemented or realized using any suitable processing system and/or device, such as, for example, one or more processors, central processing units (CPUs), controllers, microprocessors, microcontrollers, processing cores and/or other hardware computing resources configured to support the operation described herein. In various implementations, the control module 204 includes or accesses a data storage element (or memory) capable of storing programming instructions for execution that, when read and executed by the control module 204, cause the control module 204 to control operation of the motor 220 via the inverter 210 to support operations of the fly-by-wire system 100. In exemplary In the illustrated implementation, the control module 204 is coupled to a sensing arrangement 230, which generally represents one or more position sensors, speed sensors, current sensors and/or other sensing elements associated with the motor 220 that provide measurement data indicative of the current state of the motor 220 substantially in real-time (e.g., the current rotor position, the current speed, the current motor current, the current output torque, and/or the like), which, in turn, is utilized by the control module 204 to convert commands received at the input interface 202 indicative of a commanded rotational speed and/or a commanded rotational direction into corresponding power conversion commands for operating the inverter 210 to apply voltage and excite phases of the motor 220 in the appropriate sequence and manner for achieving the commanded rotational speed in the commanded rotational direction given the current position or state of the motor 220. For example, based on a current rotor position indicated by rotor position measurement data received from a position sensing arrangement 230 and a commanded rotational direction, the control module 204 may determine the appropriate sequence or order for exciting the phases of the motor 220 to produce rotation in the commanded direction and generate corresponding power conversion commands for operating the corresponding phases (or phase legs) of the inverter 210 to provide input power to those phases of the motor 220 in that order. Additionally, based on the commanded rotational speed, the control module 204 may determine the corresponding magnitude or duty cycle for the power conversion commands to result in the appropriate amount of power input to the motor 220 to achieve the commanded rotational speed.

In the illustrated embodiment, the control module 204 is coupled to gate driver circuitry 206, which generally represents the transistors, switches and/or other circuitry that is configured to activate or deactivate respective phases of the inverter 210 in accordance with the power conversion command signals from the control module 204 to enable the desired direction of current flow through the respective phases of the motor 220 to produce rotation of the rotor of the motor 220 in the commanded rotational direction. The gate driver circuitry 206 also activates or deactivates the respective phases of the inverter 210 for a duration of time (or duty cycle) in accordance with the power conversion command signals to provide the amount of input power for achieving the commanded rotational speed. For example, in one or more implementations, the power conversion command signals output by the control module 204 are realized as pulse-width modulated (PWM) duty cycle command signals or are otherwise indicative of desired PWM duty cycles corresponding to the duration of time for which each respective phase leg of the inverter 210 should be activated to provide the amount of input power to the respective phases of the motor 220 that achieves the commanded rotational speed.

The inverter 210 generally represents the combination of transistors, diode and/or other power conversion circuitry that is operable to convert DC input power from an energy source 240 into alternating current (AC) output power that is applied to the respective phases of the motor 220 in accordance with the power conversion command signals determined by the control module 204. In this regard, the power conversion commands generated by the control module 204 cause the gate driver circuitry 206 to activate the phase legs of the inverter 210 to apply the input DC voltage and/or current for a duration of a control period that corresponds to the PWM duty cycle determined by the control module 204.

In one or more exemplary implementations, the motor 220 is realized as a brushless DC (BLDC) electric motor where the inverter 210 is operated to provide input current to the different phases of the motor stator windings in the commanded sequence corresponding to the power conversion commands generated by the control module 204 to cause the rotor of the motor 220 to rotate in the commanded direction, where the duty cycle or duration of activation of the respective inverter phase legs influences the amplitude of the current flow through the motor stator windings to control the rotational speed of the rotor. In exemplary implementations when the motor 220 is realized as a BLDC motor, the position sensing arrangement 230 is realized as a set of Hall effect sensors that provided measurement data indicative of the current state or position of the rotor of the motor 220 in relation to the stator windings, which, in turn, is utilized by the control module 204 to determine which set of motor stator windings should be excited to produce subsequent rotation of the rotor based on the angular position of the rotor with respect to the motor stator windings. That said, it should be appreciated that the subject matter described herein is not limited to BLDC motors or Hall effect sensors, and in practice, the subject matter may be implemented in an equivalent manner in the context of a different type of motor 220 and/or a different type of rotor position sensing arrangement 230 (e.g., encoders, resolvers, or the like).

Still referring to FIG. 2, in exemplary embodiments, the actuation system 200 includes a voltage regulation arrangement 208 coupled between a power supply input node associated with the energy source 240 and one or more supply reference voltage nodes associated with the inverter 210 to provide a regulated output voltage at a respective supply reference voltage node of the inverter 210. For example, in one or more implementations, the power supply input node associated with the energy source 240 may be realized as a higher voltage bus, which may be regulated or unregulated, where the voltage regulation arrangement 208 includes one or more individual voltage regulating power converters, where each of the individual voltage regulating power converters is coupled between the voltage bus and one or more of the respective supply reference voltage nodes coupled to respective phase legs of the inverter 210. In this regard, the voltage regulation arrangement 208 may be configurable to provide a substantially constant or otherwise controlled output voltage(s) to the supply reference voltage node(s) of the inverter 210. For example, as described in greater detail below, in some situations, one or more voltage regulating power converters of the voltage regulation arrangement 208 may be configured to provide a substantially constant DC output voltage at one or more of the supply (or positive) reference voltage nodes of the inverter 210, while in other situations, one or more voltage regulating power converters of the voltage regulation arrangement 208 may be configured to provide an alternating current (AC) output voltage at the supply (or positive) reference voltage node(s) of the inverter 210.

As described in greater detail below, in exemplary implementations, the control module 204 may be configurable to control operation of the voltage regulation arrangement 208 in concert with operation of the inverter 210 to provide improved efficiency over a wider range of operating points, for example, by varying one or more of the type of modulation (e.g., pulse amplitude modulation (PAM), pulse width modulation (PWM), pulse frequency modulation (PFM) and/or the like), switching frequency, regulated output voltage, phase leg sequencing and/or other parameters associated with the voltage regulation arrangement 208 and/or the inverter 210. In this regard, the individual voltage regulating power converters of the voltage regulation arrangement 208 support hybrid operation of the inverter 210 and motor 220 by varying the type of commutation (e.g., DC synchronous, AC induction, asynchronous operation and/or the like) based on the current state of the motor 220 (e.g., the current motor speed, the current rotor position, the current motor torque and/or the like), while also supporting potentially different motor topologies or winding configurations (e.g., redundant 3-phase, 6-phase, 4-phase, and/or the like) by dynamically varying activation of phase legs of the inverter 210 to provide redundancy or otherwise fail operational capabilities. One or more exemplary arrangements of programmable voltage regulating power converter are described and depicted in U.S. patent application Ser. No. 18/526,831, which is incorporated by reference herein.

In exemplary implementations, the control module 204 generally includes at least one processing system, which may be implemented using any suitable processing system and/or device, such as, for example, one or more processors, central processing units (CPUs), controllers, microprocessors, microcontrollers, processing cores, application-specific integrated circuits (ASICs) and/or other hardware computing resources configured to support the operation of the control module 204 described herein. The processing system of the control module 204 also includes or otherwise accesses a data storage element (or memory), such as a random access memory (RAM), read only memory (ROM), flash memory, magnetic or optical mass storage, or any other suitable non-transitory short or long term data storage or other computer-readable media, and/or any suitable combination thereof that is capable of storing code or other computer-executable programming instructions that, when executed by the processing system, are configurable to cause the processing system to support or otherwise facilitate a variable commutation motor control service that is configurable to support the subject matter described herein.

Figure 3:
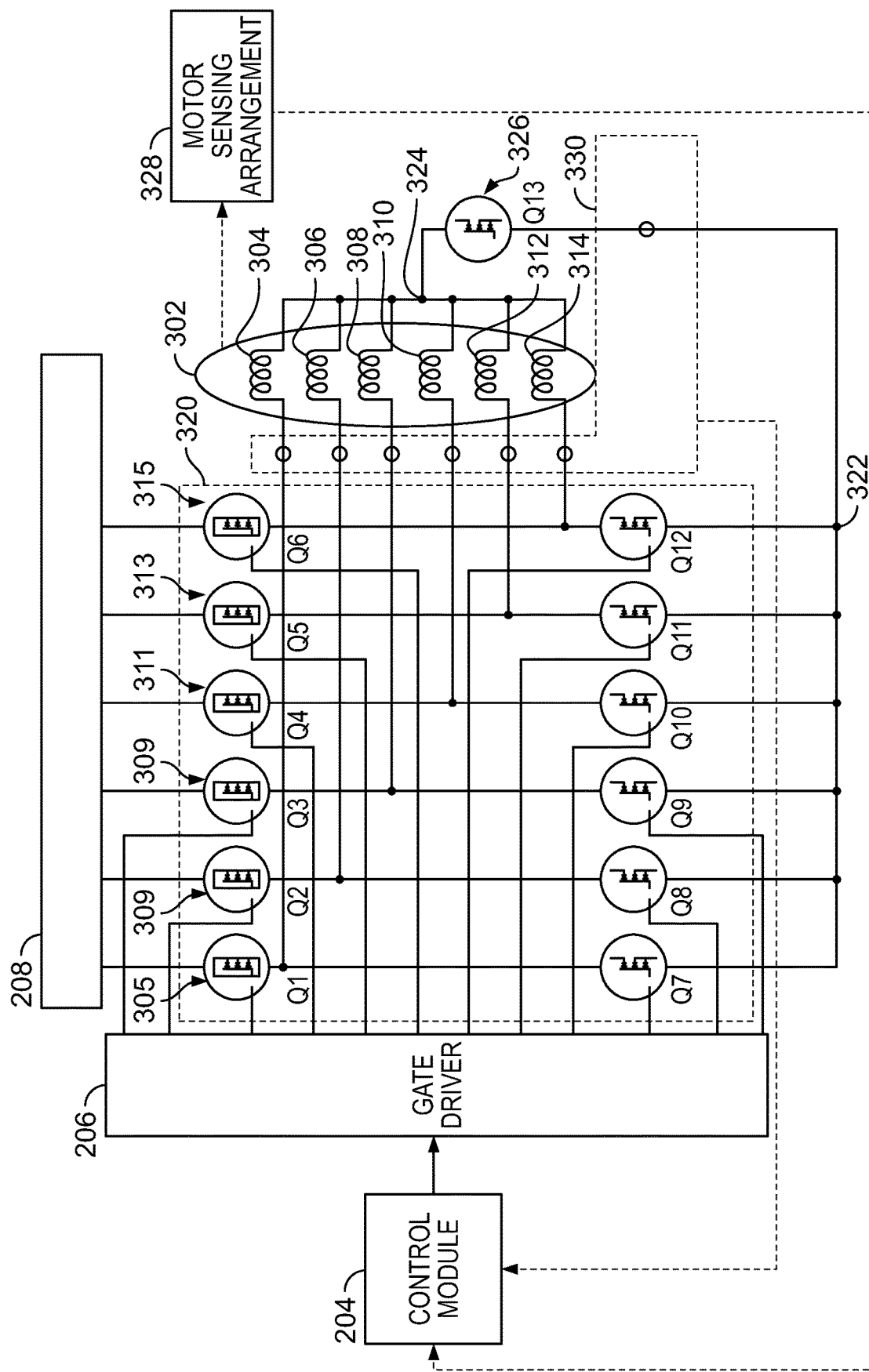
FIG. 3 is a schematic diagram of an actuation system including a six-phase electric motor and corresponding six-phase power conversion arrangement with a commutation topology configuration switching element suitable for use as a remote actuation system to control a flight control component responsive to an input command signal from a flight control module in the fly-by-wire system of FIG. 1 in an exemplary embodiment.

FIG. 3 depicts an actuation system 300 suitable for use as a remote actuation system 102, 200 in the aircraft 120 of FIG. 1. The actuation system 300 includes a six-phase electric motor 302 (e.g., motor 220) having a six-phase winding configuration including six sets of stator windings 304, 306, 308, 310, 312, 314 corresponding to respective phases of the motor 302. Each phase of windings 304, 306, 308, 310, 312, 314 is connected to a corresponding phase leg 305, 307, 309, 311, 313, 315 of an inverter 320 (e.g., inverter 210). Each phase leg 305, 307, 309, 311, 313, 315 includes a first transistor or switching element (alternatively referred to herein as an upper switch) coupled between an output reference voltage node of a voltage regulation arrangement 208 and a respective output node of the respective phase leg 305, 307, 309, 311, 313, 315 connected to a line input excitation end (or terminal) of the respective phase of stator windings 304, 306, 308, 310, 312, 314 of the electric motor 302. Each phase leg 305, 307, 309, 311, 313, 315 also includes a second transistor or switching element (alternatively referred to herein as a lower switch) coupled between the input excitation end of the respective phase of stator windings 304, 306, 308, 310, 312, 314 at the a respective output node of the respective phase leg 305, 307, 309, 311, 313, 315 and a negative (or ground) reference voltage node 322. In exemplary implementations, the opposing ends of the respective phases of stator windings 304, 306, 308, 310, 312, 314 are connected to one another at a common motor neutral node 324 in a connected neutral configuration. In practice, the negative reference voltage node 322 may be connected to a second output reference voltage node of the voltage regulation arrangement 208, such that the voltage regulation arrangement 208 is capable of regulating or otherwise controlling the voltage difference across the respective phases of stator windings 304, 306, 308, 310, 312, 314.

In exemplary implementations, a topology configuration switching element 326 is connected electrically in series between the motor neutral node 324 and the negative reference voltage node 322. The topology configuration switching element 326 is realized as a transistor or other suitable switching element that has a control input terminal connected to the control module 204 and is operable to selectively electrically connect the motor neutral node 324 to the negative reference voltage node 322. Thus, when the topology configuration switching element 326 is closed, enabled or otherwise activated, the topology configuration switching element 326 establishes an electrical connection and corresponding path for current flow between the respective neutral ends of the respective phases of stator windings 304, 306, 308, 310, 312, 314 and the negative reference voltage node 322.

When the topology configuration switching element 326 is opened, disabled or otherwise deactivated, both the upper and lower switches of the inverter phase legs 305, 307, 309, 311, 313, 315 are operable by the control module 204 (via the gate driver 206) to commutate electrical current through the motor 302 in a bipolar or bidirectional manner, such that excitation current can either flow from the output reference voltage node of the voltage regulation arrangement 208 and the input excitation end of a respective phase of stator windings 304, 306, 308, 310, 312, 314 through the respective phase of stator windings 304, 306, 308, 310, 312, 314 to the common motor neutral node 324, or from the common motor neutral node 324 through a respective phase of stator windings 304, 306, 308, 310, 312, 314 to the negative reference voltage node 322. On the other hand, when the topology configuration switching element 326 is closed, enabled or otherwise activated, the lower switches (Q7-Q12) of the inverter phase legs 305, 307, 309, 311, 313, 315 are effectively bypassed to commutate electrical current through the motor 302 in a unipolar or unidirectional manner. In a unipolar commutation configuration, the upper switches (Q1-Q6) of the inverter phase legs 305, 307, 309, 311, 313, 315 are operable by the control module 204 (via the gate driver 206) to commutate electrical current through the motor 302 unidirectionally from the output reference voltage node of the voltage regulation arrangement 208 and the line input excitation end of a respective phase of stator windings 304, 306, 308, 310, 312, 314 through the respective phase of stator windings 304, 306, 308, 310, 312, 314 to the common motor neutral node 324 and the negative reference voltage node 322 via the topology configuration switching element 326.

The actuation system 300 includes a motor sensing arrangement 328 (e.g., sensing arrangement 230) that includes a motor (or rotor) position sensing arrangement and/or a motor (or rotor) speed sensing arrangement. The motor position sensing arrangement may be realized as a resolver, encoder or other suitable position sensor capable of providing an output measurement value indicative of a measured position of the rotor of the motor 302. The motor speed sensing arrangement may include one or more Hall effect sensors or other suitable sensors capable of providing an output measurement value indicative of a measured rotational speed of the rotor of the motor 302. Additionally, the actuation system 300 includes a current sensing arrangement 330 that includes one or more current sensors capable of providing output measurement values indicative of the respective current through the respective inverter phase legs 305, 307, 309, 311, 313, 315, the respective current through the respective sets of stator windings 304, 306, 308, 310, 312, 314 and/or the respective current flow through the topology configuration switching element 326. The output current measurement data from the current sensing arrangement 330 indicative of the amount of electrical current flowing through the respective phases of the motor 302 is input or otherwise provided to the control module 204 along with the rotor position and/or speed measurement data output by the motor sensing arrangement 328 to provide feedback measurement data indicative of the current state of the motor 302.

Referring to FIG. 3 with reference to FIGS. 1-2, as described in greater detail below, based on the input commands from the flight control computer 106 or other supervisory control system, the control module 204 may calculate or otherwise determine a targeted speed for the motor 220, 302, a targeted motor current for the motor 220, 302, a targeted output torque for the motor 220, 302 and/or a targeted regulated output voltage for the voltage regulation arrangement 208 for producing the commanded actuation of a flight control component coupled to or otherwise associated with the motor 220, 302. Based on the targeted motor speed, the targeted motor current, the targeted motor torque and/or the targeted regulated output voltages, the control module 204 provides corresponding commands to the voltage regulation arrangement 208 and the gate driver circuitry 206 to operate the voltage regulation arrangement 208 and the inverter phase legs 305, 307, 309, 311, 313, 315 to achieve the targeted actuation of the motor 220, 302 and flight control component.

In exemplary implementations, the control module 204 also includes or otherwise implements commutation topology selection logic that is utilized to dynamically determine how to commutate the motor 302 and correspondingly operate the topology configuration switching element 326 in concert with determining the commands for operating the inverter phase legs 305, 307, 309, 311, 313, 315 to commutate the motor 302 in a manner that is most likely to achieve the targeted actuation of the flight control component or otherwise reduce the difference between the current state of the motor 220, 302 indicated by the feedback measurement data from the sensing arrangements 230, 328, 330 and the targeted state for the motor 220, 302 while minimizing switching losses or otherwise improving efficiency of the actuation system 102, 200, 300. In this regard, based on the current state of the aircraft 120 and/or the current state of the motor 302, the control module 204 dynamically determines what commutation topology and commutation type should be utilized and the corresponding actuation state of the commutation topology configuration switching element 326, and then based on the selected commutation topology, determines corresponding commands for operating the inverter phase legs 305, 307, 309, 311, 313, 315 to produce the desired actuation of the motor 302 using the selected commutation topology.

Figure 4:
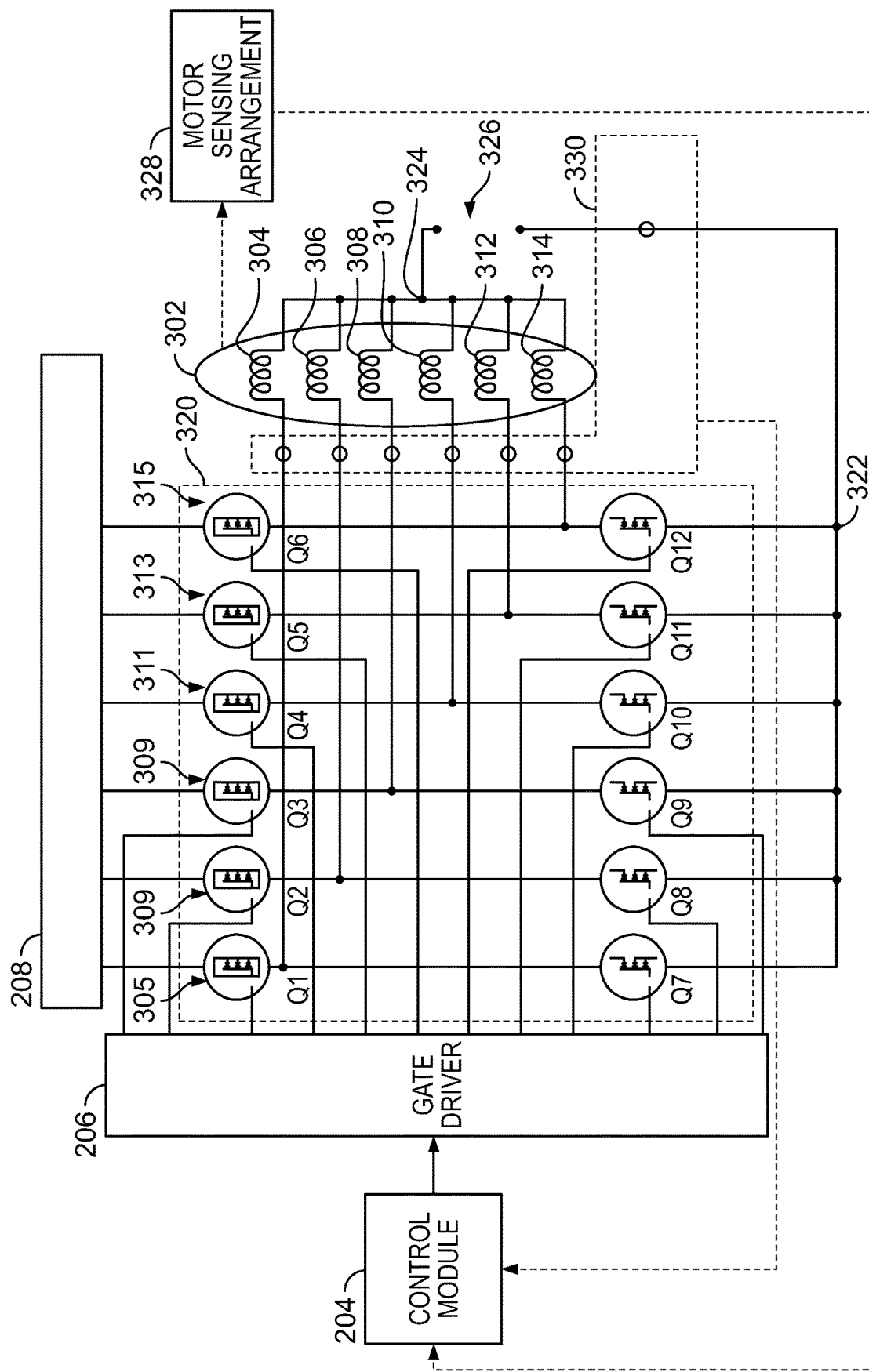
FIG. 4-6 are schematic diagrams of the actuation system of FIG. 3 depicting different commutation types and corresponding commutation topologies suitable for use with the remote actuation system to control a flight control component responsive to an input command signal from a flight control module in the fly-by-wire system of FIG. 1 in one or more exemplary embodiments.
Figure 5:
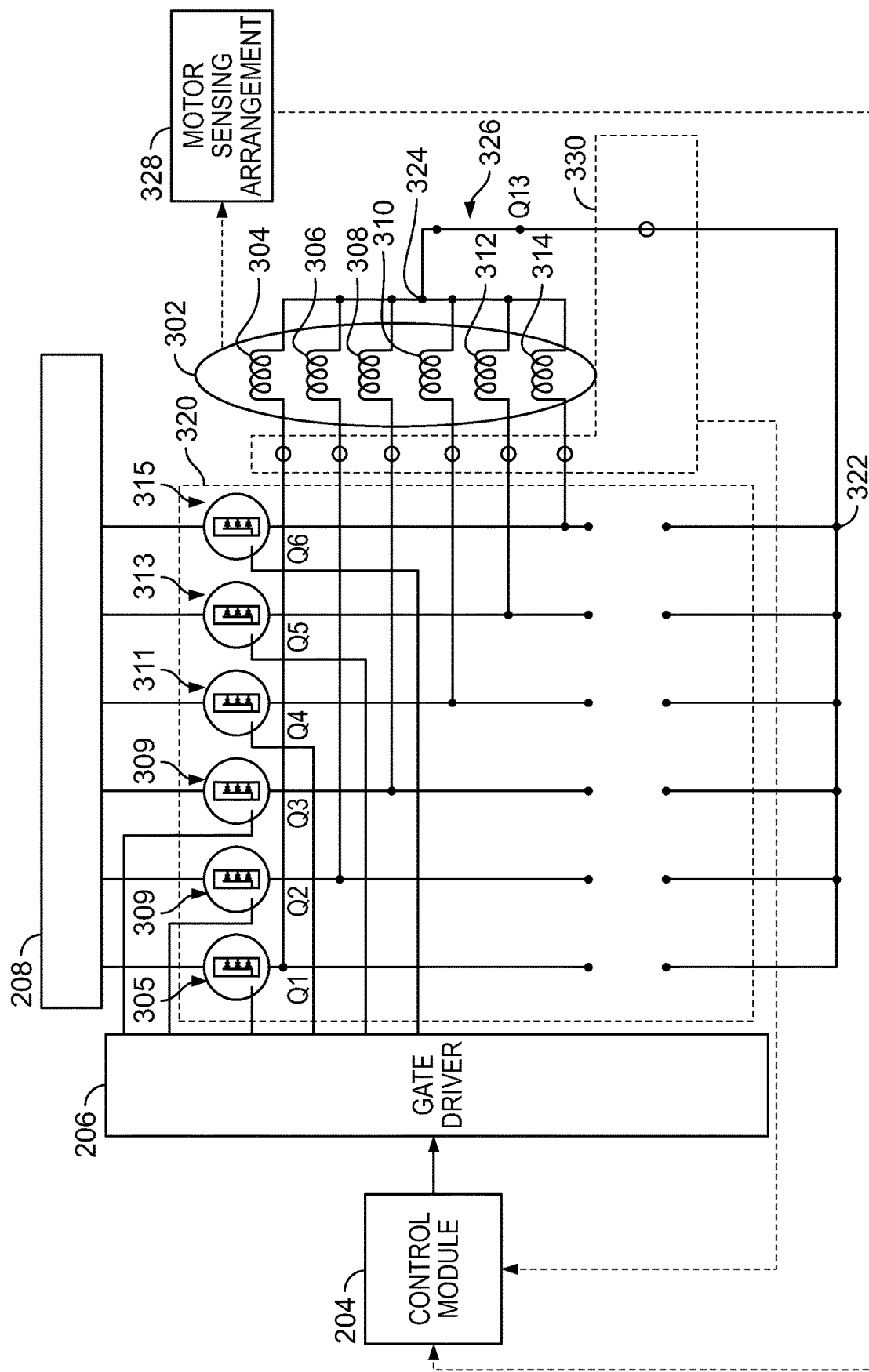
Figure 6:
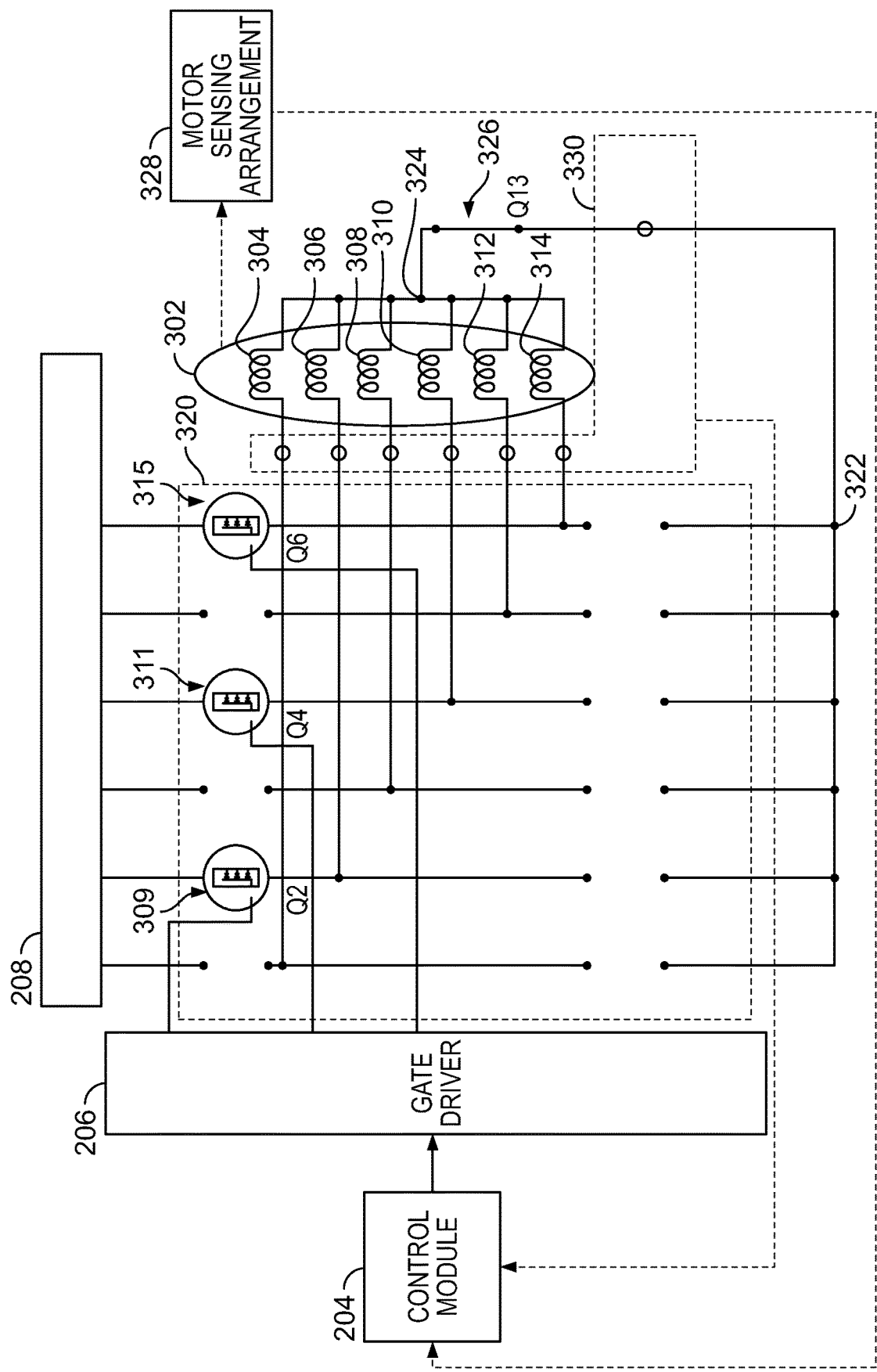

FIGS. 4-6 depict different potential topology configurations of the actuation system 300 of FIG. 3. In this regard, FIG. 4 depicts the effective electrical circuit for the actuation system 300 corresponding to a bipolar (or bidirectional) 6-phase BLDC commutation of the electric motor 302 by the control module 204 when the topology configuration switching element 326 is opened or otherwise deactivated. In such a state, the topology configuration switching element 326 provides an effective open circuit between the neutral node 324 and the negative reference voltage node 322 that allows current to flow bidirectionally through the different sets of stator windings 304, 306, 308, 310, 312, 314 depending on the manner in which the inverter phase legs 305, 307, 309, 311, 313, 315 are operated.

FIG. 5 depicts the effective electrical circuit for the actuation system 300 corresponding to a unipolar (or unidirectional) 6-phase BLDC commutation of the electric motor 302 by the control module 204 when the topology configuration switching element 326 is closed or otherwise activated. In such a state, the topology configuration switching element 326 provides an effective short circuit between the neutral node 324 and the negative reference voltage node 322 that allows current to flow unidirectionally through the different sets of stator windings 304, 306, 308, 310, 312, 314 while the lower switches (Q7-Q12) of the inverter phase legs 305, 307, 309, 311, 313, 315 are maintained deactivated and effectively open circuits to reduce switching losses. In such a configuration, the control module 204 modulates the upper switches (Q1-Q6) of the inverter phase legs 305, 307, 309, 311, 313, 315 to achieve the desired operation of the electric motor 302.

FIG. 6 depicts the effective electrical circuit for the actuation system 300 corresponding to a unipolar (or unidirectional) 3-phase synchronous AC commutation of the electric motor 302 by the control module 204 when the topology configuration switching element 326 is closed or otherwise activated. In such a state, the topology configuration switching element 326 provides an effective short circuit between the neutral node 324 and the negative reference voltage node 322 that allows current to flow unidirectionally through the subset of stator windings 306, 310, 314 associated with the respective phases of the 6-phase motor 302 being utilized to effectuate a 3-phase motor. In the unipolar commutation, the lower switches (Q8, Q10 and Q12) of the inverter phase legs 307, 311, 315 can be maintained deactivated and effectively open circuits to reduce switching losses, while both the upper and lower switches of the inverter phase legs 305, 309, 313 for the remaining phases of the 6-phase motor 302 that are not being utilized as a part of the 3-phase commutation to be maintained deactivated and effectively open circuits. In a 3-phase AC commutation topology, the control module 204 may determine corresponding commands for operating the upper switches (Q2, Q4 and Q6) of the appropriate inverter phase legs 307, 311, 315 to provide the desired AC current flow through the respective phases of stator windings 306, 310, 314 of the effective 3-phase motor. In other implementations, the control module 204 may command the voltage regulation arrangement 208 to provide the desired AC voltage across the respective phases of stator windings 306, 310, 314 to allow the upper switches of the appropriate inverter phase legs 307, 311, 315 to be maintained closed or activated to further reduce switching losses. For example, as described in U.S. patent application Ser. No. 18/526,831, some implementations of the voltage regulation arrangement 208 may include individual programmable voltage regulating power converters that are coupled between a power supply input node associated with an energy source (e.g., energy source 240) and a respective regulated supply reference voltage node associated with a respective phase leg 305, 307, 309, 311, 313, 315, where the control module 204 may command the individual programmable voltage regulating power converters to provide the desired AC voltage and/or current to the selected subset of phases of stator windings 306, 310, 314 being commutated as a 3-phase synchronous AC induction motor.

Referring to FIGS. 3-6, with reference to FIGS. 1-2, it should be appreciated that there are any number of different commutation topologies that may be utilized or implemented using the 6-phase electric motor 302 at the actuation system 102, 200, 300 depending on the state of the topology configuration switching element 326 and the manner in which the phase legs 305, 307, 309, 311, 313, 315 are operated. Moreover, it should be appreciated that there are numerous different manners in which the control module 204 may alternate commutation topologies between different commutation topologies. For example, when the control module 204 operates at a greater frequency than the rate at which the flight control module 106 provides actuation commands to the control module 204, the control module 204 may vary the commutation type and motor commutation topology during the period of time between actuation command updates. In this regard, the control module 204 may utilize different hybrid combinations of commutation topologies and different duty cycles or percentages of a particular time period or cycle during which the respective commutation topologies are utilized. Accordingly, the subject matter described herein is not intended to be limited to any particular scheme or manner in which different commutation topologies are selected or utilized.

Figure 7:
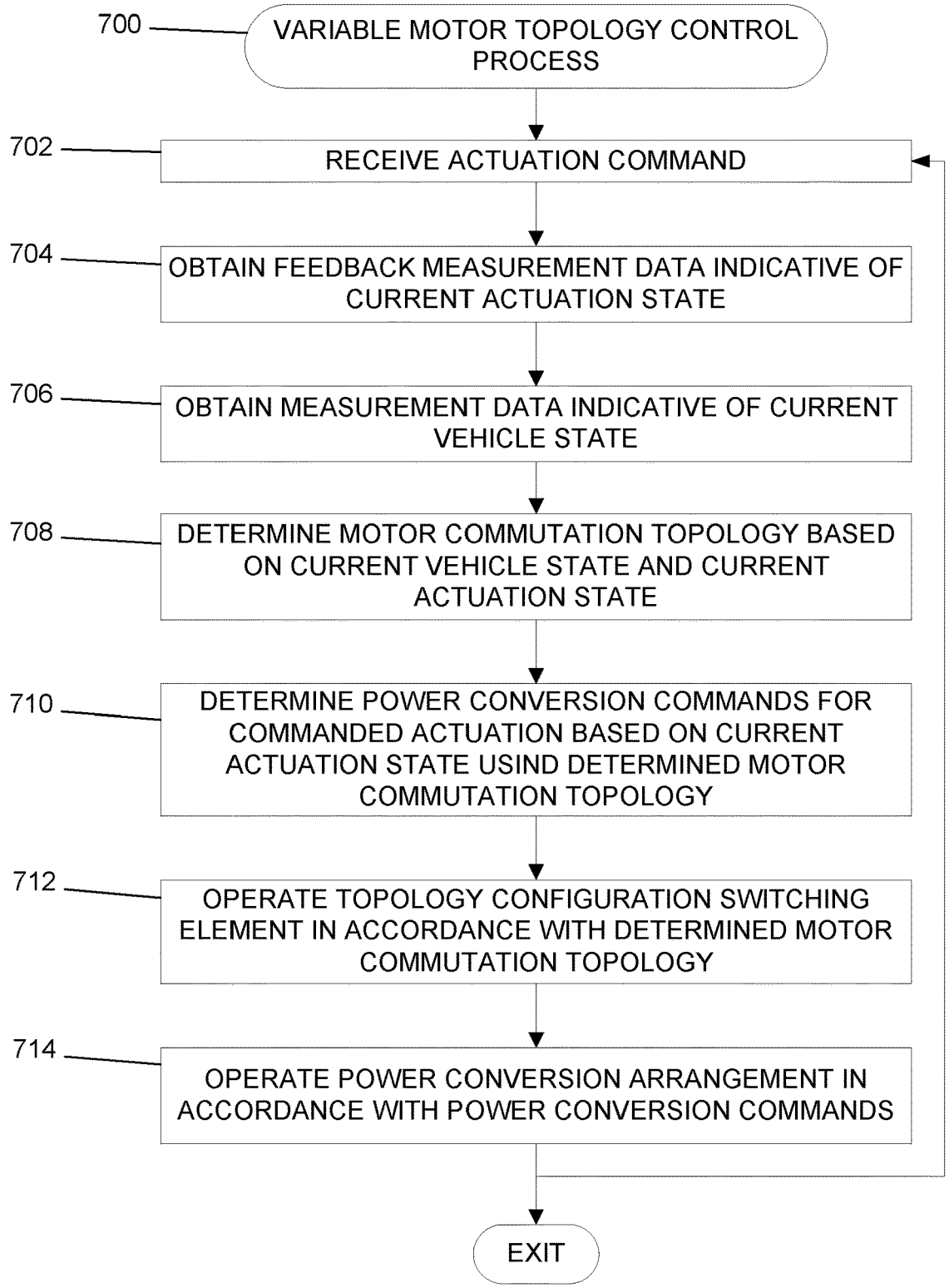
FIG. 7 is a flow diagram of an exemplary embodiment of a variable commutation control process suitable for implementation by the actuation system of FIG. 2 or FIG. 3 in the fly-by-wire system of FIG. 1 in accordance with one or more embodiments.

FIG. 7 depicts an exemplary variable commutation control process 700 suitable for implementation by an actuation system to achieve a commanded actuation of a motor or other actuator by dynamically varying a commutation type and commutation topology associated with operating the motor. The various tasks performed in connection with the illustrated process may be implemented using hardware, firmware, software executed by processing circuitry, or any combination thereof. For illustrative purposes, the following description may refer to elements mentioned above in connection with FIGS. 1-5. In practice, portions of the variable commutation control process 700 may be performed by different elements of a vehicle system. That said, exemplary embodiments are described herein in the context of the variable commutation control process 700 being primarily performed by the motor control module 204. It should be appreciated that the variable commutation control process 700 may include any number of additional or alternative tasks, the tasks need not be performed in the illustrated order and/or the tasks may be performed concurrently, and/or the variable commutation control process 700 may be incorporated into a more comprehensive procedure or process having additional functionality not described in detail herein. Moreover, one or more of the tasks shown and described in the context of FIG. 5 could be omitted from a practical embodiment of the variable commutation control process 700 as long as the intended overall functionality remains intact.

The illustrated variable commutation control process 700 initializes or otherwise begins by receiving or otherwise obtaining an actuation command that includes information indicative of a commanded actuation state (task 702). For example, as described above in the context of FIGS. 1-2, a control module 204 associated with an actuation system 102, 200, 300 may receive or otherwise obtain actuation commands from a flight control module 106 which indicate a commanded speed, position and/or other commanded actuation state attributes for a flight control component 104, which, in turn, may be utilized by the control module 204 to calculate or otherwise determine a corresponding commanded speed, position, torque and/or other actuation state attributes for the motor 220, 302 or other actuator responsible for actuating the flight control component 104.

After receiving an actuation command, the variable commutation control process 700 receives or otherwise obtains feedback measurement data indicative of the current actuation state of the motor and measurement data indicative of the current vehicle state (tasks 704, 706). For example, as described above, the control module 204 may receive or otherwise obtain feedback measurement data indicative of the current state of the motor 220 via one or more sensing arrangements 230, 328, 330 to identify the current or real-time values that characterize the attributes defining the current state of actuation of the motor 220, including, but not limited to, the current rotor position, the current motor speed (e.g., the rotational speed of the rotor), the current motor current, the current motor torque, and/or the like. Additionally, the control module 204 may receive or otherwise obtain measurement data or other information indicative of the current state of the aircraft 120 from the flight control module 106 and/or one or more onboard systems 110, such as, for example, a current altitude of the aircraft 120, a current speed of the aircraft 120, a current vertical speed of the aircraft 120, a current flight phase of the aircraft 120, a current operating mode of the aircraft 120, a current configuration of the aircraft 120, and/or the like.

After identifying the current vehicle state and the current motor state, the variable commutation control process 700 identifies, selects or otherwise determines the motor commutation topology to be utilized in accordance with commutation topology selection logic (task 708). In this regard, based on the current actuation state of the motor 220, 302, as well as the current aircraft state and/or the actuation command, the control module 204 applies commutation topology selection logic to identify the particular type of commutation or commutation topology (or a hybrid combination thereof) to be utilized when subsequently operating the motor 220, 302 to achieve the targeted or commanded actuation of the motor, while at the same time attempting to reduce switching losses and improve efficiency. For example, the control module 204 may determine whether to commutate the motor 220, 302 as a unipolar or bipolar commutation configuration, and then furthermore, determine whether to commutate the motor 220, 302 as a particular motor topology or configuration for that commutation configuration or a hybrid combination of topologies, including, but not limited to 6-phase, redundant 3-phase, 4-phase, 3-phase, 2-phase and/or the like. In this regard, it should be appreciated that the subject matter described herein is not limited to any particular type of commutation or motor topology to be employed.

In an exemplary implementation, when the current speed of the motor is below a lower speed threshold value, the commanded actuation corresponds to a motor torque command above an upper torque threshold value, the control module 204 may determine that the commutation type to be utilized when operating the power conversion arrangement 210 should correspond to a bipolar six-phase BLDC motor topology. When the current speed of the motor is above the lower speed threshold value and the commanded actuation corresponds to a motor torque command below upper torque threshold value, but the current flight phase or operating mode of the aircraft 120 corresponds to primarily vertical flight (e.g., takeoff, landing, climb, descent, etc.), the control module 204 may determine that the commutation type to be utilized when operating the power conversion arrangement 210 should correspond to a unipolar six-phase BLDC motor topology to maintain the potential torque capability of the motor 220, 302 to support vertical flight while reducing switching losses associated with the lower switches of the inverter phase legs 305, 307, 309, 311, 313, 315. On the other hand, once the current aircraft altitude, the current aircraft speed, and/or the current flight phase or operating mode of the aircraft 120 indicates that the aircraft 120 is in primarily forward flight or is otherwise transitioning to forward flight, the control module 204 may determine that the commutation type to be utilized when operating the power conversion arrangement 210 should correspond to a unipolar three-phase BLDC motor topology (or a redundant 3-phase motor topology) to support higher motor speeds with improved efficiency while maintaining torque capability associated with BLDC motors and reducing switching losses associated with the subset of the inverter phase legs 305, 307, 309, 311, 313, 315 that are not being operated to support 3-phase operation at a particular point in time. That said, once the current motor speed is greater than an upper speed threshold and the current aircraft state and/or the current actuation commands correspond to higher speed and/or lower torque operation, the control module 204 may determine that the commutation type to be utilized when operating the power conversion arrangement 210 should correspond to a unipolar three-phase AC induction motor topology to support potentially higher motor speeds with improved efficiency while further reducing switching losses associated with the lower switches of the subset of the inverter phase legs 305, 307, 309, 311, 313, 315 being operated to support 3-phase operation at a particular point in time. In this manner, the control module 204 may dynamically vary the commutation type associated with the electric motor 220, 302 between unipolar and bipolar commutation, while also varying the particular effective configuration topology of the motor.

Based on the selected commutation type and motor commutation topology, the variable commutation control process 700 continues by determining power conversion commands for achieving the commanded actuation using the selected commutation type and motor commutation topology, and then correspondingly operates the topology configuration switching element and the power conversion arrangement to use the selected commutation type and motor commutation topology in accordance with the power conversion commands (tasks 710, 712, 714). In this regard, the control module 204 provides duty cycles, modulation commands or other power conversion commands to the gate driver circuitry 206 which operates the phase legs of the inverter 210 or other power conversion arrangement in accordance with the input modulation commands to achieve the desired commutation of the motor 220, 302 while concurrently operating the topology configuration switching element 326 in the desired manner. For example, to support a six-phase BLDC motor topology with bipolar commutation, the control module 204 may determine corresponding power conversion commands for operating the phase legs 305, 307, 309, 311, 313, 315 of the inverter 210 corresponding to the respective motor phases in the appropriate sequence to produce the commanded rotation of the rotor while commutating current bidirectionally through the motor 220, 302 by maintaining the topology configuration switching element 326 open. On the other hand, to support a six-phase BLDC motor topology with unipolar commutation, the control module 204 may close, enable or otherwise activate the topology configuration switching element 326 to enable unipolar commutation and then determine corresponding power conversion commands for operating the upper switches (Q1-Q6) of the phase legs 305, 307, 309, 311, 313, 315 of the inverter 210 to produce the commanded rotation of the rotor while commutating current unidirectionally through the motor 220, 302.

In some implementations, the variable commutation control process 700 monitors the relationship between the current actuation state and the commanded actuation state and dynamically adjusts the commutation type and/or the commutation topology being implemented based on any differences between the current actuation state and the commanded actuation state to reduce the difference or otherwise regulate the current actuation state to the commanded actuation state until receiving an updated actuation command. In this regard, the measurement data indicative of the current actuation state of the motor 220, 302 provided by one or more sensing arrangements 230, 328, 330 may be fed back to the control module 204 to effectively provide closed-loop control of the motor 220 by dynamically varying or adjusting the commutation topology. For example, when the measured torque of the motor 220, 302 is below the targeted or commanded motor torque and the motor 220, 302 is being commutated as a unipolar 6-phase BLDC motor, the control module 204 may be configured to open, deactivate or otherwise adjust operation of the topology configuration switching element 326 to commutate the motor 220, 302 as a bipolar 6-phase BLDC motor to increase the motor torque and reduce the difference between the measured or observed motor torque and the commanded motor torque. On the other hand, when the measured speed of the motor 220, 302 is below the targeted or commanded motor speed, the control module 204 may adjust operation of the topology configuration switching element 326 and the phase legs 305, 307, 309, 311, 313, 315 to commutate the motor 220, 302 as a bipolar 6-phase AC induction motor or another motor commutation topology that provides better speed control.

In implementations where the control module 204 selects a hybrid combination of motor commutation topologies to be utilized, the control module 204 may be configured to dynamically vary the respective duty cycles or percentages associated with the respective motor commutation topologies to reduce the difference from a commanded parameter. For example, the control module 204 may determine that the operation of the motor 220, 302 should alternate back and forth between bipolar 6-phase BLDC and unipolar 6-phase BLDC for a commanded actuation with a 50% duty cycle or otherwise equal distribution of the time period between when the commanded actuation is received and when an updated actuation command is received. During that period of time, when the measured or observed torque associated with the motor 220, 302 falls behind the targeted or commanded motor torque, the control module 204 may progressively increase the duty cycle associated with the bipolar 6-phase BLDC commutation and correspondingly decrease the duty cycle associated with the unipolar 6-phase BLDC commutation to provide better torque control. On the other hand, if the measured or observed speed associated with the motor 220, 302 falls behind the targeted or commanded motor speed, the control module 204 may progressively increase the duty cycle associated with the unipolar 6-phase BLDC commutation and correspondingly decrease the duty cycle associated with the bipolar 6-phase BLDC commutation to provide better motor speed control.

In practice, the variable commutation control process 700 may repeat during operation of the aircraft to dynamically vary the commutation type and motor commutation topology in a manner that is influenced by the current aircraft state and the current actuation state of the motor to achieve the desired tradeoffs between performance, efficiency, reliability and/or redundancy. For example, for a VTOL aircraft, UAM vehicle or other vehicle having a propulsion system including a 6-phase electric motor 220, 302 configured to operate any one of the propulsion components 104, at takeoff where an input command from a flight control computer 106 may correspond to a 4000 rpm command speed, the motor control module 204 may determine to commutate the motor 220, 302 as a bipolar 6-phase BLDC motor while the motor speed is less than a 5000 rpm threshold value. To commutate the motor 220 as a 6-phase bipolar BLDC motor, the control module 204 may open or deactivate the topology configuration switching element 326 while operating the inverter 210 to provide 6-phase BLDC control until the target motor speed of 4000 rpm is reached based on the measured motor speed feedback from the motor speed sensing arrangement 328.

Thereafter, when targeted motor speed command changes, for example, in response to transitioning from a takeoff or climbing flight phase to a cruising flight phase, the motor control module 204 may determine to commutate the motor 220, 302 in a hybrid mode by toggling the topology configuration switching element 326 to alternate between 6-phase bipolar BLDC commutation and 6-phase unipolar BLDC commutation. For example, in response to the current altitude of the aircraft 120 being greater than an altitude threshold value indicative of a transition from takeoff to cruising, the current speed of the aircraft 120 being greater than a speed threshold value indicative of a transition from takeoff to cruising, and/or in response to the measured motor speed exceeding a transition threshold value (e.g., 5000 rpm), the motor control module 204 may begin alternating between providing power conversion commands to produce the commanded actuation using 6-phase bipolar BLDC commutation and power conversion commands to produce the commanded actuation 6-phase unipolar BLDC commutation for the time period between updated actuation commands. In this regard, while implementing the unipolar commutation, activation of the topology configuration switching element 326 reduces switching losses associated with operation of the inverter 210 by approximately 50% by virtue of the lower switches (Q7-Q12) of the inverter phase legs 305, 307, 309, 311, 313, 315 being opened or otherwise deactivated. In some implementations, the motor control module 204 may dynamically vary the duty cycle or period of operation associated with the respective bipolar and unipolar commutation topologies substantially in real-time based on the current altitude, speed, flight phase and/or other contextual state information for the aircraft 120 and/or the motor actuation state. For example, the motor control module 204 may progressively increase the duty cycle associated with operation with the 6-phase unipolar BLDC commutation topology in a manner that is proportional to increases in the measured motor speed relative to the transition threshold value.

Thereafter, in response to transitioning into the cruising flight phase, the motor control module 204 may determine to commutate the motor 220, 302 in a unipolar mode by maintaining the topology configuration switching element 326 in the closed or activated state while the measured motor speed is at or above a cruising speed threshold. Moreover, in some implementations, the motor control module 204 may transition to commutating the motor 220, 302 as an AC induction motor or other commutation topology while maintaining the unipolar commutation. For example, once the motor speed is above an upper speed threshold and/or a commanded motor torque falls below a motor speed threshold, the motor control module 204 may determine to commutate the motor 220, 302 in unipolar AC induction mode or a hybrid mode that alternates between unipolar BLCD and unipolar AC induction commutation topologies to further reduce switching losses and improve efficiency and/or performance of the motor 220, 302 at higher speeds. For example, while maintaining the unipolar commutation, the motor control module 204 may transition to operating the motor 220, 302 as a 6-phase BLDC motor to an effective 3-phase AC induction motor (e.g., by activating three of the phases of the inverter 210 that are associated with respective motor phases that are 120 degrees apart electrically, and deactivating the remaining phases of the inverter 210 (e.g., a duty cycle of 0%) to conserve energy). Moreover, in implementations where the voltage regulation arrangement 208 includes programmable voltage regulating power converters, the motor control module 204 may operate the programmable voltage regulating power converters of the voltage regulation arrangement 208 associated with the active phases of the inverter 210 to provide a substantially sinusoidal AC voltage at the respective power supply input nodes of those inverter phase legs while disabling current flow and/or input power to the inactive phases of the inverter 210. In such implementations, while operating motor as a 3-phase AC induction motor, the control module 204 may provide closed-loop speed control of the motor 220, 302 by operating the programmable voltage regulating power converters of the voltage regulation arrangement 208 to adjust the amplitude and/or frequency of the AC input voltage to the respective active inverter phase legs to regulate the motor speed feedback measurement to the targeted motor speed command.

It should be noted that the foregoing describes exemplary scenarios from transitioning from a lower speed and/or higher torque operating state for the aircraft 120 to a higher speed and/or lower torque operating state, namely transitioning from takeoff or vertical flight and climbing to cruising or forward flight, the subject matter may implemented in an equivalent manner in the reverse direction. For example, in response to transitioning from the cruise flight phase to a descent flight phase and then landing, the motor control module 204 may dynamically adjust the commutation topology for the motor 220, 302 to progressively transition from unipolar AC induction topologies to unipolar BLDC topologies and ultimately to bipolar 6-phase BLDC commutation to provide the desired torque control and/or performance for landing. Accordingly, hybrid combinations of phases can be employed to create multiple motor commutation sub-topologies (e.g., 6-phase, redundant 3-phase, 4-phase, redundant 2-phase, 3-phase, 2-phase, etc.), with variable unipolar or bipolar commutation, based on power demand at different torques and speeds, spanning DC synchronous, AC induction asynchronous or a hybrid mode of operation. In this regard, by virtue of the topology configuration switching element 326, the commutation topologies utilized for operating the motor 220, 302 may dynamically vary based on the current operating state or context to provide the desired torque and/or speed control appropriate for the current operating context in a manner that improves efficiency and reduces switching losses, thereby improving miles per kilowatt-hour (kWh) for UAM, VTOL and other electric propulsion vehicles. Improving efficiency may reduce power demand, and thereby reduce battery size, weight and other costs while providing added value in a highly redundant, reliable and failsafe system.

For the sake of brevity, conventional techniques related to avionics systems, VTOL aircraft or other UAM vehicles, rotorcraft or other aircraft, fly-by-wire systems, motor controls, power converters, voltage regulators, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Those of skill in the art will appreciate that the various illustrative logical blocks, modules, circuits, and algorithm steps described in connection with the embodiments disclosed herein may be implemented in varying ways for each particular application, but such implementation decisions should not be interpreted as causing a departure from the scope of the present invention. In addition, those skilled in the art will appreciate that embodiments described herein are merely exemplary implementations.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system comprising:
a power conversion arrangement comprising a plurality of phase legs, wherein each phase leg of the plurality of phase legs is coupled between a first reference voltage node and a second reference voltage node;
a six-phase motor comprising a plurality of windings, wherein each winding of the plurality of windings is coupled between a respective output node of a respective phase leg of the plurality of phase legs and a third node;
a topology configuration switching element coupled between the third node and the second reference voltage node; and
a control module coupled to the topology configuration switching element and the power conversion arrangement to operate the topology configuration switching element based on measurement data indicative of a current state of the six-phase motor and operate a respective subset of the plurality of phase legs based at least in part on a state of the topology configuration switching element.

2. The system of claim 1, wherein the control module is configured to activate the topology configuration switching element to vary a commutation type associated with the six-phase motor from bipolar commutation to unipolar commutation.

3. The system of claim 2, wherein the control module is configured to operate the respective subset of the plurality of phase legs to vary a commutation topology of the six-phase motor based at least in part on the commutation type.

4. The system of claim 3, wherein the control module is configured to activate the topology configuration switching element when a current speed of the six-phase motor is greater than a threshold speed and operate the respective subset of the plurality of phase legs to vary the commutation topology of the six-phase motor from brushless direct current (BLDC) to alternating current (AC) induction.

5. The system of claim 3, wherein the control module is configured to activate the topology configuration switching element when a current speed of the six-phase motor is greater than a threshold speed and operate the respective subset of the plurality of phase legs to vary the commutation topology of the six-phase motor from bipolar brushless direct current (BLDC) to unipolar BLDC.

6. The system of claim 1, further comprising one or more onboard systems associated with a vehicle to provide the measurement data indicative of a current state of the vehicle, wherein the control module is configured to activate the topology configuration switching element to vary a commutation type associated with the six-phase motor from bipolar commutation to unipolar commutation based at least in part on the current state of the vehicle.

7. The system of claim 6, wherein:
the vehicle comprises a vertical takeoff and land (VTOL) aircraft including an actuatable flight control component coupled to the six-phase motor;
the current state of the VTOL aircraft comprises at least one of a current altitude, a current speed and a current flight phase of the VTOL aircraft; and
the control module is configured to activate the topology configuration switching element to vary the commutation type based at least in part on the current state of the VTOL aircraft.

8. The system of claim 1, the control module is configured to activate the topology configuration switching element when a current speed of the six-phase motor is greater than a threshold speed.

9. The system of claim 8, wherein activation of the topology configuration switching element disables bidirectional current flow through the six-phase motor.

10. The system of claim 8, wherein activation of the topology configuration switching element disables bidirectional current flow through the power conversion arrangement.

11. The system of claim 1, the control module is configured to deactivate the topology configuration switching element when a current output torque associated with the six-phase motor is less than a threshold torque.

12. The system of claim 11, wherein deactivation of the topology configuration switching element enables bidirectional current flow through the six-phase motor.

13. The system of claim 11, wherein deactivation of the topology configuration switching element enables bidirectional current flow through the power conversion arrangement.

14. The system of claim 1, wherein:
the third node comprises a common neutral node of the six-phase motor in a connected neutral configuration; and
the topology configuration switching element is connected between the common neutral node of the six-phase motor and the second reference voltage node.

15. A method of operating a six-phase motor associated with an actuatable component of a vehicle, the method comprising:
receiving an actuation command for the actuatable component;
obtaining, from one or more systems onboard the vehicle, measurement data indicative of a current operating state associated with the vehicle;

identifying a commutation type for the six-phase motor based at least in part on the current operating state associated with the vehicle;

operating a topology configuration switching element connected between a common neutral node of the six-phase motor and a reference node to based on the commutation type to vary the commutation type from a prior commutation type; and operating one or more phase legs of a power conversion arrangement to provide input power to the six-phase motor based at least in part on the actuation command in accordance with the commutation type based at least in part on a state of the topology configuration switching element, wherein each phase leg of the one or more phase legs is coupled between a voltage regulation arrangement and the reference node and each winding of a plurality of windings of the six-phase motor is coupled between a respective output node of a respective phase leg of the one or more phase legs and the common neutral node.

16. The method of claim 15, wherein:

obtaining the measurement data comprises obtaining the measurement data indicative of a current actuation state of the six-phase motor from a motor sensing arrangement; and automatically identifying the commutation type comprises determining to vary the commutation type for the six-phase motor from a bipolar commutation to a unipolar commutation based at least in part on the current actuation state.

17. The method of claim 15, wherein:

the vehicle comprises a vertical takeoff and land (VTOL) aircraft;

obtaining the measurement data comprises obtaining the measurement data indicative of the current operating state of the VTOL aircraft; and automatically identifying the commutation type comprises determining to vary the commutation type for the six-phase motor from a bipolar commutation to a unipolar commutation based at least in part on the current operating state of the VTOL aircraft.

18. The method of claim 17, wherein the current operating state of the VTOL aircraft comprises at least one of a current altitude, a current speed and a current flight phase of the VTOL aircraft.

19. A non-transitory computer-readable medium having computer-executable instructions stored thereon that, when executed by a processing system, cause the processing system to:

receive an actuation command for an actuatable component of a vehicle;

obtain, from one or more systems onboard the vehicle, measurement data indicative of a current operating state associated with the vehicle;

identify a commutation type for a six-phase motor coupled to the actuatable component based at least in part on the current operating state associated with the vehicle;

operate a topology configuration switching element connected between a common neutral node of the six-phase motor and a reference node to based on the commutation type to vary the commutation type from a prior commutation type; and operate one or more phase legs of a power conversion arrangement to provide input power to the six-phase motor based at least in part on the actuation command in accordance with the commutation type based at least in part on a state of the topology configuration switching element, wherein each phase leg of the one or more phase legs is coupled between a voltage regulation arrangement and the reference node and each winding of a plurality of windings of the six-phase motor is coupled between a respective output node of a respective phase leg of the one or more phase legs and the common neutral node.

20. The non-transitory computer-readable medium of claim 19, wherein:

the vehicle comprises a vertical takeoff and land (VTOL) aircraft;

the actuatable component comprises a flight control component;

the current operating state comprises at least one of a current altitude, a current speed and a current flight phase of the VTOL aircraft; and the commutation type comprises one of a bipolar commutation and a unipolar commutation different from the prior commutation type.

\* \* \* \* \*